(12) United States Patent
Huang

(10) Patent No.: US 6,425,999 B1
(45) Date of Patent: Jul. 30, 2002

(54) WARM/COLD DOUBLE-CIRCULATION WATER FILTER SYSTEM AND SWIMMING POOL ARRANGEMENT

(76) Inventor: Stone Huang, No. 22-1, Alley 57, Lane 278, Yung-Chi Rd., Hsin-Yi District, Taipei City (TW)

(*) Notice: Subject to any disclaimer, the term of this patent is extended or adjusted under 35 U.S.C. 154(b) by 0 days.

(21) Appl. No.: 09/752,428

(22) Filed: Jan. 3, 2001

(51) Int. Cl.⁷ .................................................. E04H 4/12
(52) U.S. Cl. ....................... 210/169; 210/181; 210/186; 4/489; 4/493; 4/505
(58) Field of Search ................................. 210/169, 181, 210/184, 186, 416.2; 4/489, 493, 505

(56) References Cited

U.S. PATENT DOCUMENTS

| | | | | |
|---|---|---|---|---|
| 3,460,166 A | * | 8/1969 | Weber ............................ 4/493 |
| 3,781,925 A | * | 1/1974 | Curtis et al. ................... 4/413 |
| 3,837,016 A | * | 9/1974 | Schindler et al. .............. 4/489 |
| 3,859,214 A | * | 1/1975 | Lang et al. .................. 210/169 |
| 3,912,627 A | * | 10/1975 | Tepas, Jr. .................... 210/169 |
| 3,969,248 A | * | 7/1976 | Whitmer ...................... 210/169 |
| 3,988,787 A | * | 11/1976 | Colee ............................ 4/489 |
| 4,001,899 A | * | 1/1977 | Mathis ........................... 4/493 |
| 4,240,165 A | * | 12/1980 | Kyrias ........................... 4/505 |
| 4,371,003 A | * | 2/1983 | Goguen .......................... 4/489 |
| 4,930,168 A | * | 6/1990 | Ferlise ........................... 4/505 |
| 5,415,221 A | * | 5/1995 | Zakryk .......................... 4/489 |

* cited by examiner

Primary Examiner—Christopher Upton
(74) Attorney, Agent, or Firm—Rosenberg, Klein & Lee

(57) ABSTRACT

A warm/cold double-circulation water filter system and swimming pool arrangement includes a swimming pool separated into two pools, each pool having a water outlet and a plurality of water inlets, a double-circulation water filter system adapted to treat water circulated through the pools of the swimming pool, the double-circulation water filter system including a first filter unit, a second filter unit, and a heater, and a water pipe system adapted to deliver water from the water outlet of each of the pools of the swimming pool to the water inlets of each of the pools of the swimming pool through the double-circulation water filter system, the water pipe system having valve means selectively controlled to let water pass from the first filter unit and second filter unit of the double-circulation water filter system to the water inlets of the pools of the swimming pool via the heater.

2 Claims, 4 Drawing Sheets

WARM/COLD DOUBLE-CIRCULATION WATER FILTER SYSTEM AND SWIMMING POOL ARRANGEMENT

BACKGROUND OF THE INVENTION

The present invention relates to swimming pools and, more specifically, to a double-circulation water filter system and swimming pool arrangement, which enables warm and/or cold water to circulate through two separated pools of the swimming pool via a double-circulation water filter system.

Regular swimming pools are commonly designed for circulation of cold water through a single-circulation water filter system. FIG. 1 shows the arrangement of a swimming pool and single-circulation water filter system according to the prior art. A swimming pool of this design is suitable for use in summer season only. There are also known swimming pools for circulation of warm water. However, some people would not like to swim in warm water even in winter season. According to conventional designs, it is expensive to build a swimming pool for cold water and a swimming pool for warm water. Further, building two swimming pools requires a big land area.

SUMMARY OF THE INVENTION

The present invention has been accomplished to provide a warm/cold double-circulation water filter system and swimming pool arrangement, which separates the swimming pool into two pools for enabling warm/cold water to be respectively circulated through the pools of the swimming pool via a respective water filter unit. It is another object of the present invention to provide a warm/cold double-circulation water filter system and swimming pool arrangement, which enables warm/cold water to be selectively circulate through the two pools of the swimming pool. The warm/cold double-circulation water filter system and swimming pool arrangement of the present invention comprises a swimming pool separated into two pools, each pool having a water outlet and a plurality of water inlets, a double-circulation water filter system adapted to treat water circulated through the pools of the swimming pool, the double-circulation water filter system including a first filter unit, a second filter unit, and a heater, and a water pipe system adapted to deliver water from the water outlet of each of the pools of the swimming pool to the water inlets of each of the pools of the swimming pool through the double-circulation water filter system, the water pipe system having valve means selectively controlled to let water pass from the first filter unit and second filter unit of the double-circulation water filter system to the water inlets of the pools of the swimming pool via the heater.

DETAILED DESCRIPTION OF THE PREFERRED EMBODIMENT

Figure 1:
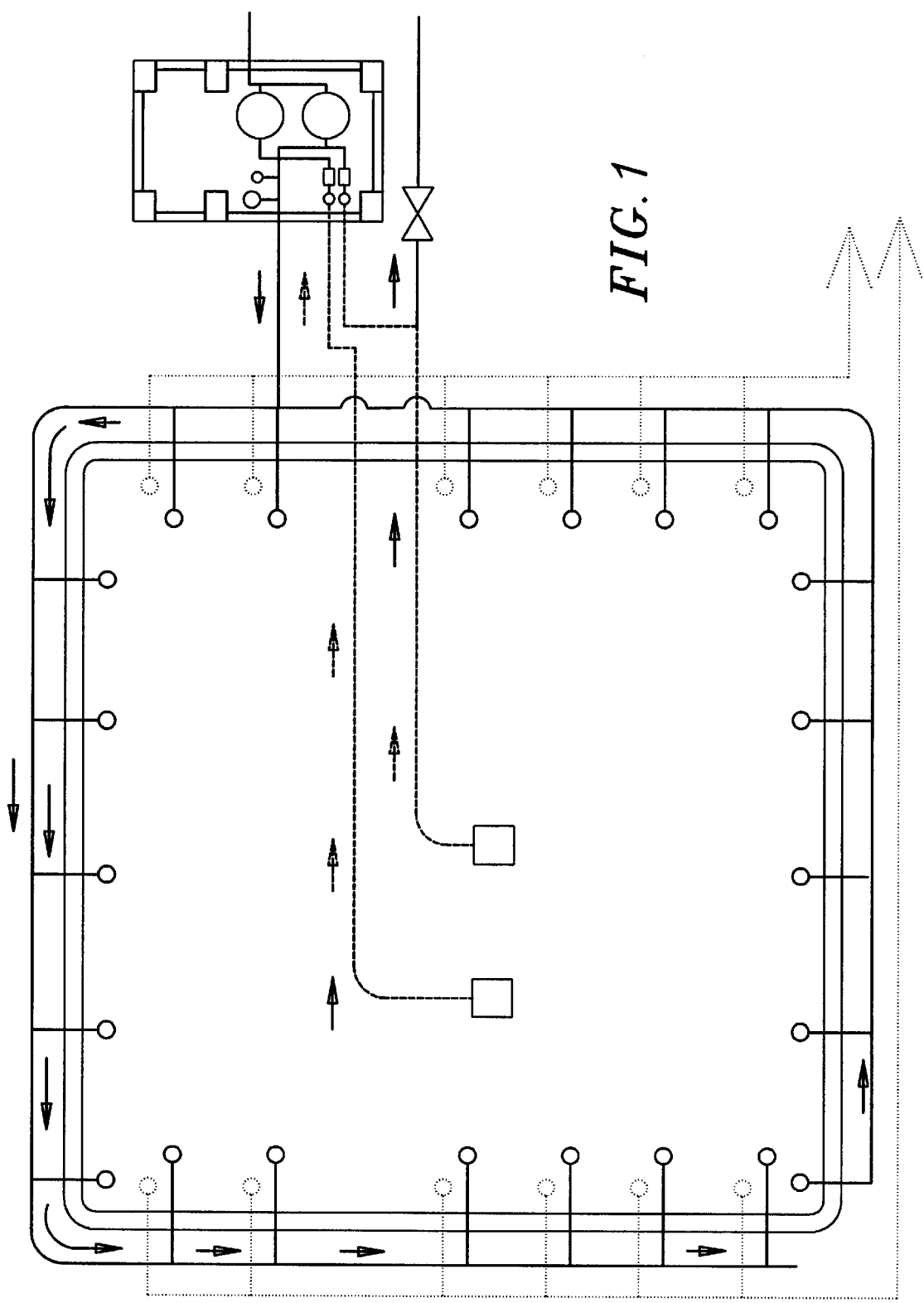
FIG. 1 illustrates the arrangement of a swimming pool and a single-circulation cold-water filter system according to the prior art.
Figure 2:
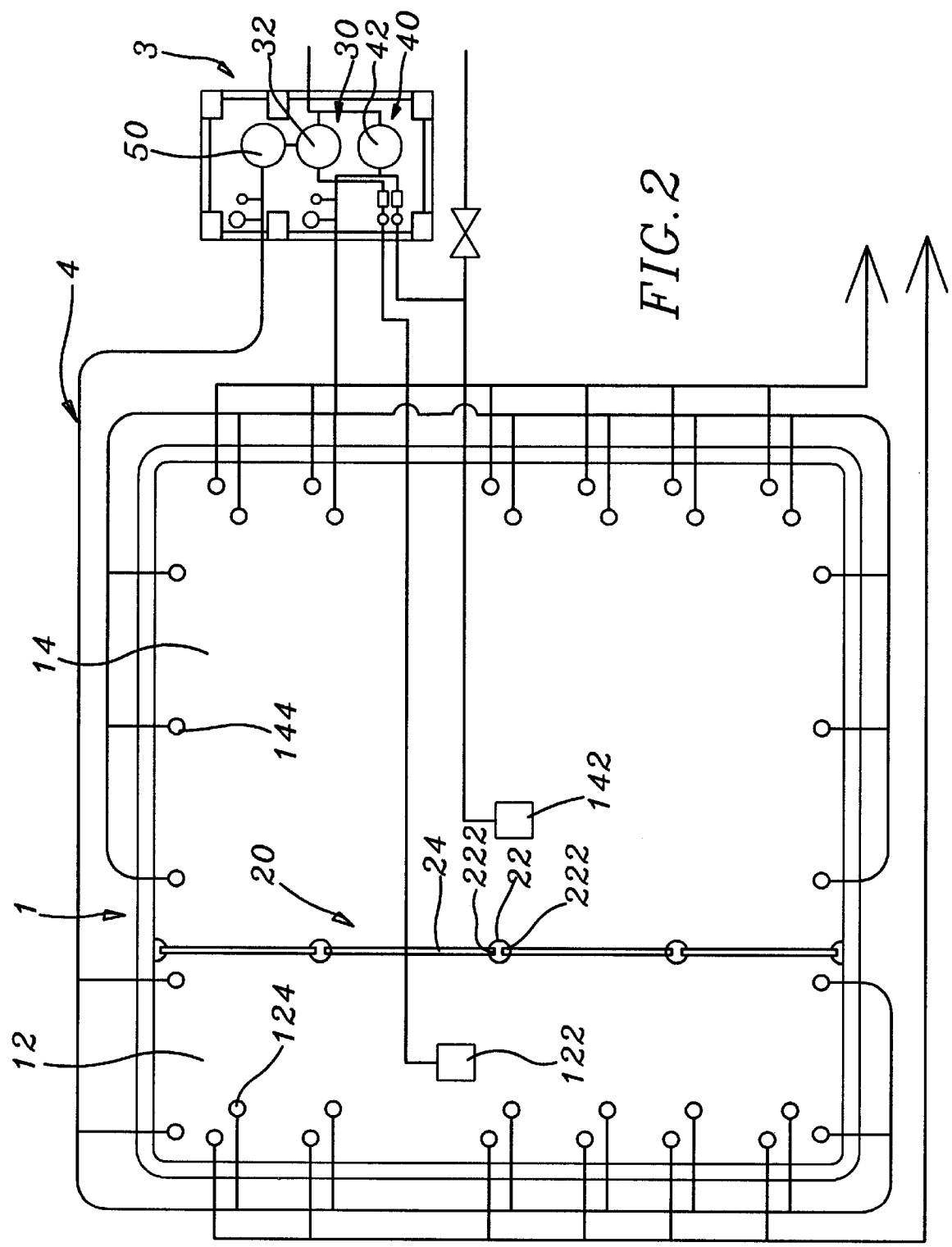
FIG. 2 illustrates a warm/cold double-circulation water filter system and swimming pool arrangement according to the present invention.

Referring to FIG. 2, a swimming pool 1 comprises a partition wall 20. The partition wall 20 is comprised of a plurality of round pots 22 and partition boards 24, and separates the swimming pool 1 into two separated pools, namely, the first pool 12 and the second pool 14. The pools 12 and 14 each have a water outlet 122 or 142, and a plurality of water inlets 124 or 144. The round rods 22 are fixedly perpendicularly fastened to the bottom wall of the swimming pool 1, and aligned in a line between the two endwalls of the swimming pool 1 (i.e., in parallel to the two sidewalls of the swimming pool 1). Each round post 22 has two longitudinal coupling grooves 222 disposed at two sides. The partition boards 20 are respectively coupled to the coupling grooves 222 of the round posts 22. The round posts 22 are preferably mad of stainless steel. The partition boards 24 are made of material of high tensile strength. The partition wall 20 prevents circulation of water between the pools 12 and 14.

Figure 3:
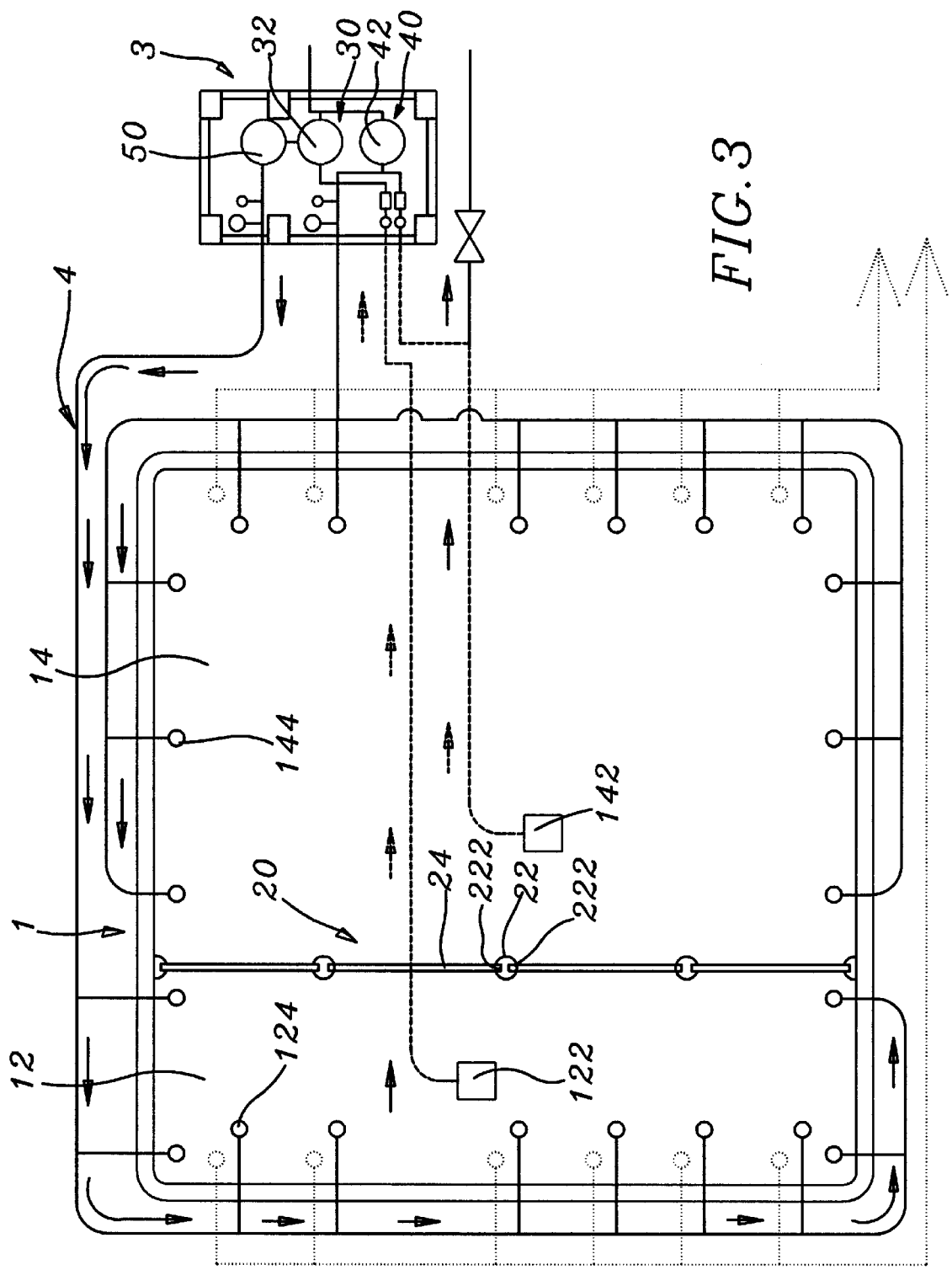
FIG. 3 illustrates water circulation paths through the two pools of the swimming pool according to the present invention.
Figure 4:
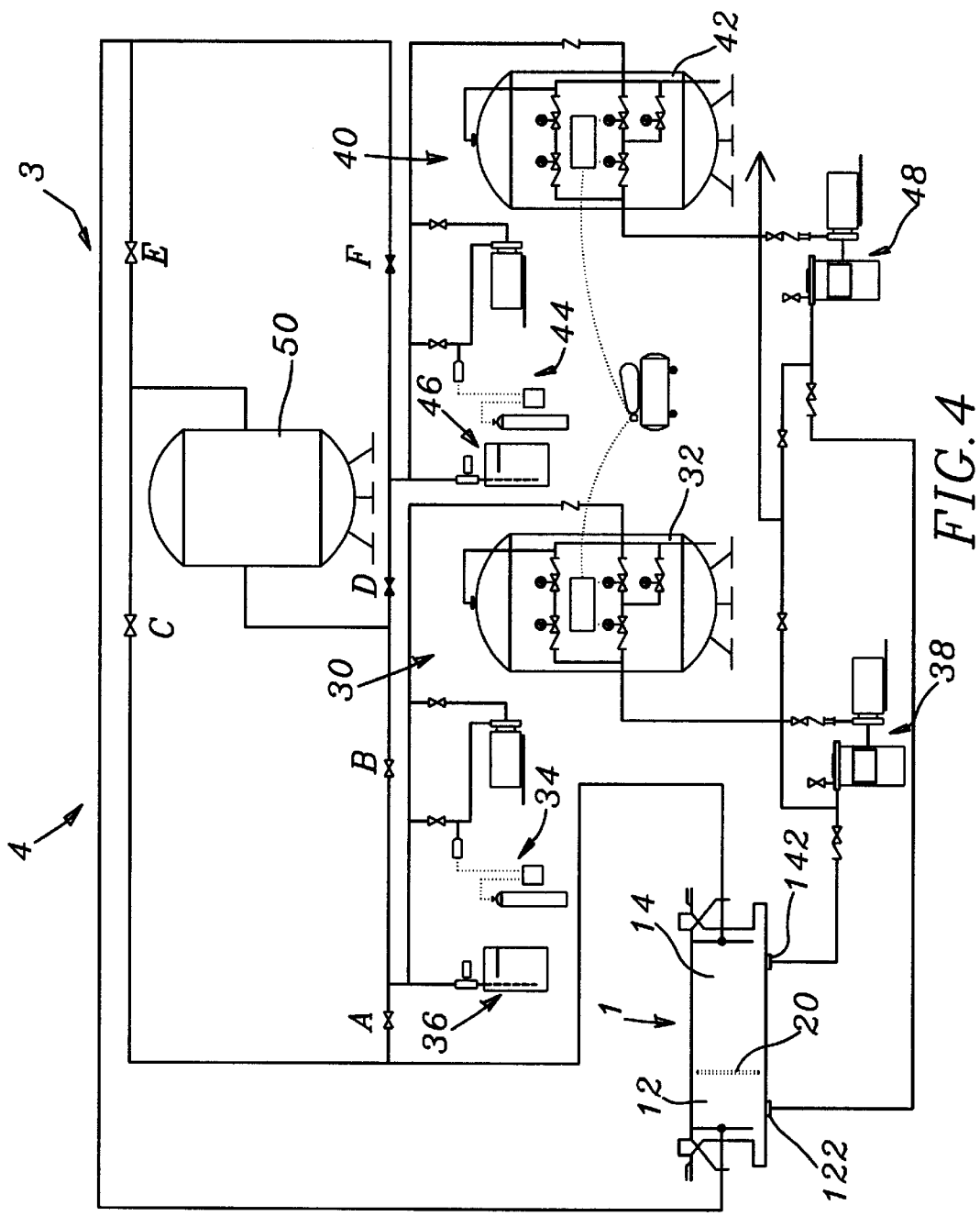
FIG. 4 illustrates the arrangement of the double-circulation water filter system and the water pipe system according to the present invention.

Referring to FIGS. 3 and 4 and FIG. 2 again, the present invention further comprises a double-circulation water filter system 3, and a water pipe system 4. The double-circulation water filter system 3 comprises two filter units, namely, the first filter unit 30 and the second filter unit 40, and a heater 50. The filter units 30 and 40 each comprise a filter tank 32 or 42, a chlorinator 34 or 44, a chemical dispenser 36 or 46, and a hair remover 38 or 48, and are controlled to filter and sterilize water passing through. The water pipe system 4 connects the water outlets 122 and 142 of the pools 12 and 14 to the water inlets 124 and 144 through the double-circulation water filter system 3. Water outputted from the water outlet 122 or 142 of the pool 12 or 14 is delivered by the water pipe system 4 to the double-circulation water filter system 3 for treatment, and well-treated water is then delivered by the water pipe system 4 to the pool 12 or 14 through the respective water inlets 124 or 144. Electromagnetic valves A, B, C, D, E and F are installed in the water pipe system 4, and adapted to control the flowing direction of water.

Referring to FIG. 4 again, the pools 12 and 14 are separated from each other for circulation of hot water and cold water respectively. The operation procedure of the present invention is outlined hereinafter:

1. When the second pool 14 is set for warm water, the first pool 12 is set for cold water, the electromagnetic valves A, D and E are closed, and the electromagnetic valves B, C and F are opened. At this time, warm water passes out of the water outlet 142 of the second pool 14 through the water pipe system 4 into the first filter unit 30 where warm water is treated in proper order through the hair remover 38, the filter tank 32, the chlorinator 34 and the chemical dispenser 36, and then passes out of the chemical dispenser 36 of the first filter unit 30 through the electromagnetic valve B to the heater 50 for heating, and then passes from the heater 50 through the electromagnetic valve C to the second pool 14 again. At the same time, cold water passes out of the water outlet 122 of the first pool 12 through the water pipe system 4 into the second filter unit 40 where cold water is treated in proper order through the hair remover 48, the filter tank 42, the chlorinator 34 and the chemical dispenser 46, and then passes from the chemical dispenser 46 of the second filter unit 40 through the electromagnetic valve F to the first pool 12 again.

2. When the second pool 14 is set for cold water, the first pool 12 is set for warm water, the electromagnetic valves A, D and E are opened, and the electromagnetic valves B, C and F are closed. At this time, warm water passes out of the water outlet 122 of the first pool 12 through the water pipe system 4 into the second filter unit 40 where warm water is treated in proper order through the hair remover 48, the filter tank 42, the chlorinator 44 and the chemical dispenser 46, and then passes out of the chemical dispenser 46 of the second filter unit 30 through the electromagnetic valve D to the heater 50 for heating, and then passes from the heater 50 through the electromagnetic valve E to the first pool 12 again. At the same time, cold water passes out of the water outlet 142 of the second pool 14 through the water pipe system 4 into the first filter unit 30 where cold water is treated in proper order through the hair remover 38, the filter tank 32, the chlorinator 34 and the chemical dispenser 36, and then passes from the chemical dispenser 36 of the first filter unit 30 through the electromagnetic valve A to the second pool 14 again.

3. When both pools 12 and 14 are set for cold water in Summer, the electromagnetic valves B, C, D and E are closed, and the electromagnetic valves A and F are opened. In this case, water is prohibited from passing through the heater 5. On the contrary, when both pools 12 and 14 are set for warm water in winter, the electromagnetic valves A and F are closed, and the electromagnetic valves B, C, D and E are opened. In this case, water from the first pool 12 as well as w the second pool 14 is allowed to pass through the heater 50 for heating.

As indicated above, the warm/cold double-circulation water filter system and swimming pool arrangement of the present invention comprises a swimming pool, which is separated by a partition wall into two separated pools, a double-circulation water filter system, which has two filter units adapted to filter water from the two pools respectively, a heater adapted to heat water passing through, and a water pipe system with valve means adapted to control circulation of water from each pool through the double-circulation water filter system only, or selectively through the double-circulation water filter system and the heater.

It is to be understood that the drawings are designed for purposes of illustration only, and are not intended for use as a definition of the limits and scope of the invention disclosed.

What the invention claimed is:

1. A warm/cold double-circulation water filter system and swimming pool arrangement comprising:

a swimming pool, said swimming pool including two pools and a partition wall separating the pools, wherein the two pools of said swimming pool each include a water outlet and a plurality of water inlets;

a double-circulation water filter system configured to treat water circulated through the pools of said swimming pool, said double-circulation water filter system including a first filter unit, a second filter unit, and a heater, said first filter unit and said second filter unit each including a hair remover, a filter tank, a chlorinator and a chemical dispenser respectively connected in series and configured to filter and treat water passing therethrough; and a water pipe system configured to deliver water from the water outlet of each of the two pools of said swimming pool to the water inlets of each of the two pools of said swimming pool through said double-circulation water filter system, said water pipe system incorporating valve means for:

(a) selectively connecting said water outlet of each of said two pools of said swimming pool to either said first filter unit or said second filter unit, (b) selectively connecting said first filter unit or said second filter unit to said heater, and (c) selectively connecting said heater to said plurality of water inlets of either or both of said two pools of said swimming pool.

2. The warm/cold double-circulation water filter system and swimming pool arrangement of claim 1, wherein the partition wall of said swimming pool comprises a plurality of upright round posts arranged in a longitudinal line between two endwalls thereof, said upright round posts each having two longitudinal coupling grooves, and a plurality of partition boards respectively fastened to the coupling grooves of said upright round posts to stop water from passing between the two pools of said swimming pool.

* * * * *